United States Patent
Shen

(10) Patent No.: US 7,570,189 B2
(45) Date of Patent: Aug. 4, 2009

(54) RADIO FREQUENCY DATA CAPTURE

(75) Inventor: Richard Chi-Te. Shen, Leonia, NJ (US)

(73) Assignee: NXP B.V., Eindhoven (NL)

( * ) Notice: Subject to any disclaimer, the term of this patent is extended or adjusted under 35 U.S.C. 154(b) by 1468 days.

(21) Appl. No.: 10/183,822

(22) Filed: Jun. 27, 2002

(65) Prior Publication Data

US 2004/0001688 A1   Jan. 1, 2004

(51) Int. Cl.
*H03M 1/12* (2006.01)
(52) U.S. Cl. .................. 341/155; 375/130; 375/132
(58) Field of Classification Search ........... 341/110, 341/144, 155, 143; 710/72; 348/784, 384; 375/130, 132
See application file for complete search history.

(56) References Cited

U.S. PATENT DOCUMENTS

| 3,947,827 | A  |   | 3/1976  | Dautremont, Jr. et al. ...... 365/45 |
| 4,318,183 | A  |   | 3/1982  | Byington et al. ............. 710/72 |
| 4,409,617 | A  | * | 10/1983 | Whitehead et al. ........... 348/461 |
| 4,679,168 | A  |   | 7/1987  | Conway et al. ............... 375/92 |
| 4,713,662 | A  | * | 12/1987 | Wiegand ...................... 342/13 |
| 4,772,873 | A  | * | 9/1988  | Duncan ...................... 341/110 |
| 4,866,441 | A  | * | 9/1989  | Conway et al. ............. 341/122 |
| 4,928,104 | A  |   | 5/1990  | Schaffer ..................... 342/15 |
| 4,972,275 | A  |   | 11/1990 | Spitz et al. ................. 360/15 |
| 5,469,508 | A  | * | 11/1995 | Vallier ......................... 381/63 |
| 5,689,529 | A  | * | 11/1997 | Johnson ...................... 375/259 |
| 5,831,574 | A  | * | 11/1998 | Krasner .................. 342/357.08 |
| 5,999,561 | A  | * | 12/1999 | Naden et al. ................ 375/142 |
| 6,310,646 | B1 | * | 10/2001 | Shi et al. ..................... 348/194 |
| 6,748,021 | B1 | * | 6/2004  | Daly .......................... 375/261 |
| 7,099,368 | B2 | * | 8/2006  | Santhoff et al. ............. 375/130 |
| 7,133,375 | B1 | * | 11/2006 | Molla ........................ 370/320 |
| 2003/0053794 | A1 | * | 3/2003 | Krouglov et al. .............. 386/95 |

* cited by examiner

*Primary Examiner*—Peguy JeanPierre

(57) ABSTRACT

A method and system to process a spectrum of radio frequency (RF) signals. An analog to digital (A/D) converter is adapted to sample and digitize a spectrum of radio frequency (RF) signals. The spectrum of RF signals include a plurality of modulation techniques. The A/D converter is further adapted to sample the spectrum at a rate that is at least twice the frequency of the highest frequency signal that is contained within the spectrum. The digitized data stored in a memory device. A processor is adapted to process the digitized data.

21 Claims, 4 Drawing Sheets

RADIO FREQUENCY DATA CAPTURE

BACKGROUND OF THE INVENTION

1. Technical Field

The present invention relates to a system and associated method to capture a spectrum of radio frequency signals.

2. Related Art

Capturing and storing data extracted from a spectrum of radio frequency (RF) signals typically requires the limitation of having to tune to a channel or frequency band to select and capture desired information thereby limiting the amount of data that may be captured. Thus there is a need for a system and associated method to capture data from a spectrum of RF signals without having to tune to a channel or frequency band.

SUMMARY OF THE INVENTION

The present invention provides a system to process a spectrum of radio frequency (RF) signals, comprising:

an analog to digital (A/D) converter, wherein the A/D converter is adapted to sample and digitize a spectrum of RF signals such that digitized data is generated, wherein the signals comprise a plurality of modulation techniques, wherein A/D converter is further adapted to sample the spectrum of RF signals at a rate that is at least twice the frequency of the highest frequency signal contained within the spectrum;

at least one memory device adapted to store the digitized data; and a processor adapted to process the digitized data.

The present invention provides a method to process a spectrum of radio frequency (RF) signals, comprising:

sampling and digitizing, by an analog to digital (A/D) converter, a spectrum of radio RF signals such that digitized data is generated, wherein the spectrum of RF signals comprise a plurality of modulation techniques, and wherein the A/D converter samples the spectrum of RF signals at a rate that is at least twice the highest frequency of the highest frequency signal contained within the spectrum;

storing the digitized data on a memory device; and processing the digitized data using a processor.

DETAILED DESCRIPTION OF THE INVENTION

Figure 1:
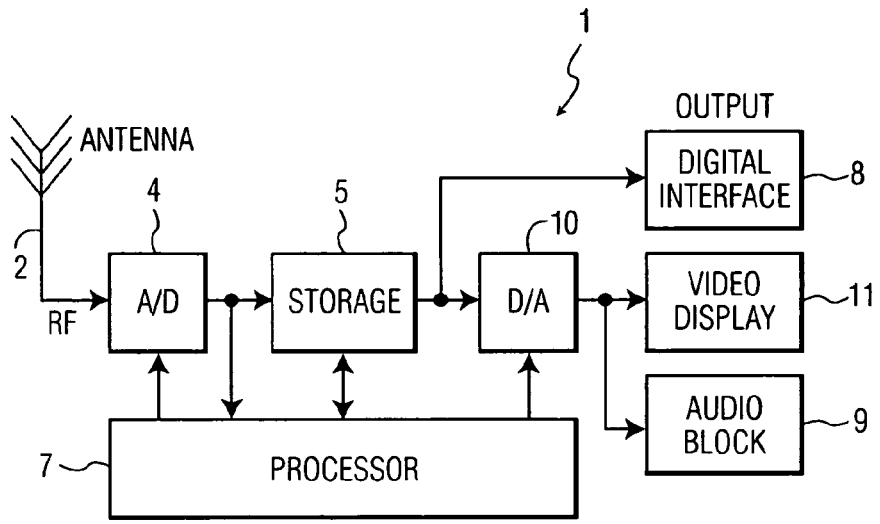
FIG. 1 depicts a block diagram view of a system to process a spectrum of radio frequency (RF) electromagnetic signals, in accordance with embodiments of the present invention.

FIG. 1 illustrates a block diagram view of a system 1 process a spectrum of radio frequency (RF) electromagnetic signals, in accordance with embodiments of the present invention. The RF signals relate to various types of data such as audio data (e.g., radio), video data (e.g., television), digital data (e.g., stock market information), or any combination thereof. An antenna 2 coupled to an analog to digital (A/D) converter 4 receives incoming RF signal data. The A/D converter 4 may be a wide band A/D converter. The A/D converter 4 may be a high speed A/D converter. The A/D converter 4 captures and converts the RF signal to a digital form in accordance with a plurality of modulation techniques. According to Nyquist's sampling theory, the entire spectrum of RF signals may be sampled at a rate that is at least twice the highest frequency of the of the highest frequency signal contained within the spectrum so that the signal may be subsequently reconstructed for all frequencies that are less than or equal to half the sampling rate. Said invention may capture any frequency within the Federal Communications Commission (FCC) defined spectrum of 9 KHz to 300 Ghz. Thus the A/D converter 4 may be clocked at twice the highest frequency of the highest frequency signal contained within the spectrum. The modulation techniques comprise any modulation technique known to a person of ordinary skill in the art such as amplitude modulation (AM), quadrature amplitude modulation (QAM), vestigial side band modulation, frequency modulation, amplitude shift keying, frequency shift keying, phase shift keying, delta modulation, pulse code modulation, pulse width modulation, pulse amplitude modulation, minimum shift keying, continuous phase modulation, etc. The system 1 does not require any prior knowledge of the RF signal or associated modulation technique that will be captured. The A/D converter 4 digitizes the spectrum of RF signals and generates digitized data. A storage device 5 may store the digitized data. The device 5 may be any storage device known to a person of ordinary skill in the art such as a hard drive, an optical disc, etc. A plurality of storage devices may be used. A processor 7 may be used to control the system 1, set the A/D sampling frequency, and manage the data. The processor 7 performs demodulation on the stored data. The processor 7 may first set the A/D sampling frequency to first capture data comprising a first modulation technique (e.g., AM). Then the processor 7 may subsequently set the A/D sampling frequency to capture a second modulation technique (e.g., FM) etc. This process is defined as spectral hopping and benefits the system 1 by requiring less storage and reduced computation time by each type of demodulation independently in relation to the sampling rate that was used. The processor 7 may comprise a central processing unit (CPU), an input device, an output device, and software. The input device may be any input device known to a person of ordinary skill in the art such as a keypad, keyboard, mouse etc. The output device may be any output device known to a person of ordinary skill in the art such as a monitor, printer, etc. A digital to analog converter (D/A) 10 may be used to convert digital data to analog form for user output. A video display 11 may be used to output video data. An audio block comprising an amplifier and a speaker may be used to output audio data. Alternatively, a digital interface 8 may be used to output digital data from the storage device 5. The digital interface 8 may include a universal serial bus (USB), an IEEE 1394 interface, a RS232 interface, a small computer system interface (SCSI), a PC card, etc. The processor 7 may sort and extract desired data based on a user input request described infra in conjunction with FIG. 4. Alternatively, the processor 7 may not require direct user input to sort and extract desired data. For example, default categories such as an automobile traffic report, news, music, etc. may be set up as applications for the processor 7 to execute. The user may select a desired category for playback. The system 1 may capture and store all received data prior to analyzing the data. Alternatively, the system 1 may capture and analyze data simultaneously and only desired data is stored on the device 5.

Figure 2:
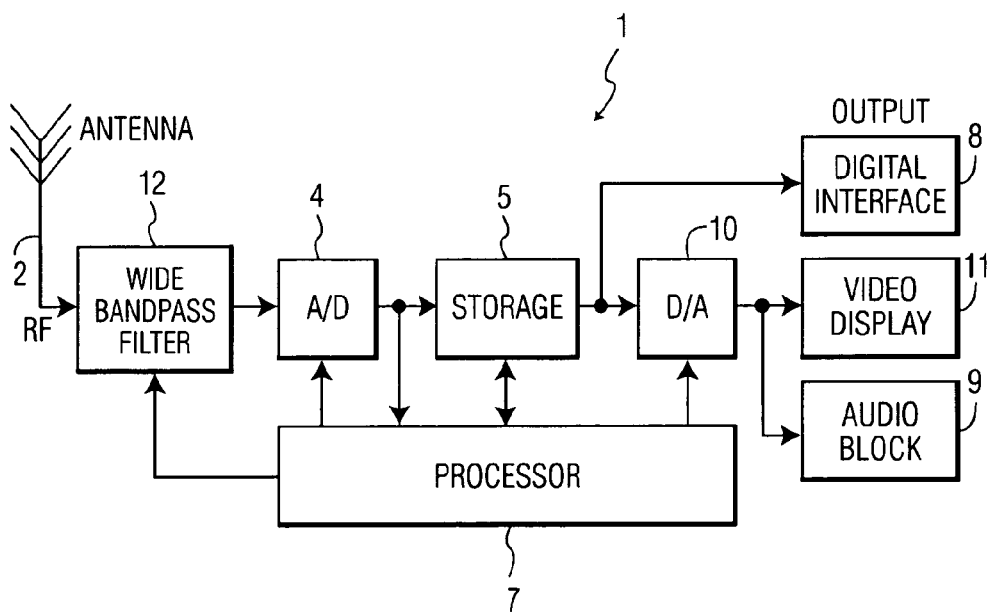
FIG. 2 depicts a variation of FIG. 1 showing a block diagram view of the system with the addition of a filter, in accordance with embodiments of the present invention.

FIG. 2 illustrates variation of FIG. 1 showing a block diagram view of a system 1 to process a spectrum of radio frequency (RF) electromagnetic signals, in accordance with embodiments of the present invention. In contrast with FIG. 1 a filter 12 has been added to the system 1 in FIG. 2. The antenna 1 may be coupled to the filter 12. The filter 12 may be used to eliminate signals having undesired frequencies from the spectrum of RF signals before the spectrum is digitized. As a result, less data is captured and stored in the storage device 5, thereby freeing up memory and eliminating extra processing by the processor 7. The filter 12 may be inter alia a wide bandpass filter.

Figure 3:
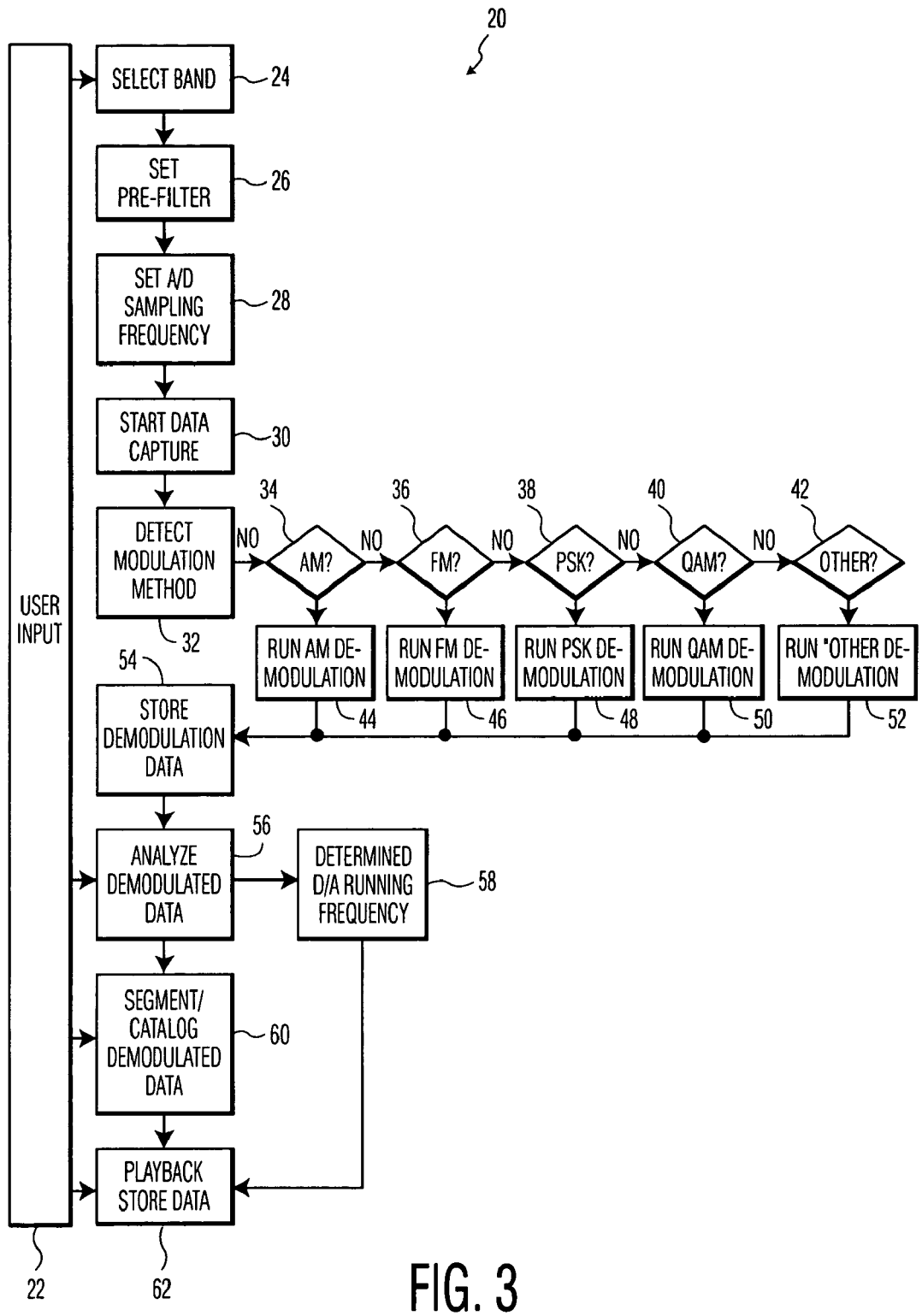
FIG. 3 is a flowchart depicting an algorithm for processing user inputs to a processor, in accordance with embodiments of the present invention.

FIG. 3 is a flowchart depicting an algorithm 20 for processing user inputs to the processor 7 in FIG. 2, in accordance with embodiments of the present invention. The algorithm 20 may be implemented in software that is executed by a central processing unit (CPU) within the processor 7. Step 22 represents a user input request. In step 24 the user selects a specified band of frequencies. Step 26 selects a filter such as the filter 12 in FIG. 2. The filter 12 eliminates any unwanted radio frequency (RF) signal. In step 28 a sampling frequency is set by the processor 7 for analog to digital conversion. The sampling frequency may be set to at least twice the highest frequency of the band of frequencies based on the Nyquist sampling theorem. In step 30 the digitized data is captured and in step 32 a modulation method is detected. If step 34 determines that amplitude modulation (AM) has been detected in step 32, then step 44 performs AM demodulation. If step 36 determines that frequency modulation (FM) has been detected in step 32, then step 46 performs FM demodulation. If step 38 determines that phase shift keying (PSK) has been detected in step 32, then step 48 performs PSK demodulation. If step 40 determines that quadrature amplitude modulation (QAM) has been detected in step 32, then step 50 performs QAM demodulation. Step 42 represents the detection in step 32 of any other modulation technique known to a person of ordinary skill in the art and step 52 performs demodulation in relation to said any other modulation technique. In step 54 the demodulated data is stored on the storage device 5 of FIG. 2. In step 56 the demodulated data is analyzed based on the user input request of step 22. In analysis of the data, the digital/analog (D/A) running frequency may be determined in step 58 so that the type of data (i.e., audio, video, digital, etc) may be determined for user output in step 62. Alternatively, in step 60 the analysis of the demodulated data includes segmenting or cataloging the demodulated data into groups based on user input as shown in FIG. 4 and outputs the data for the user in step 62.

Figure 4:
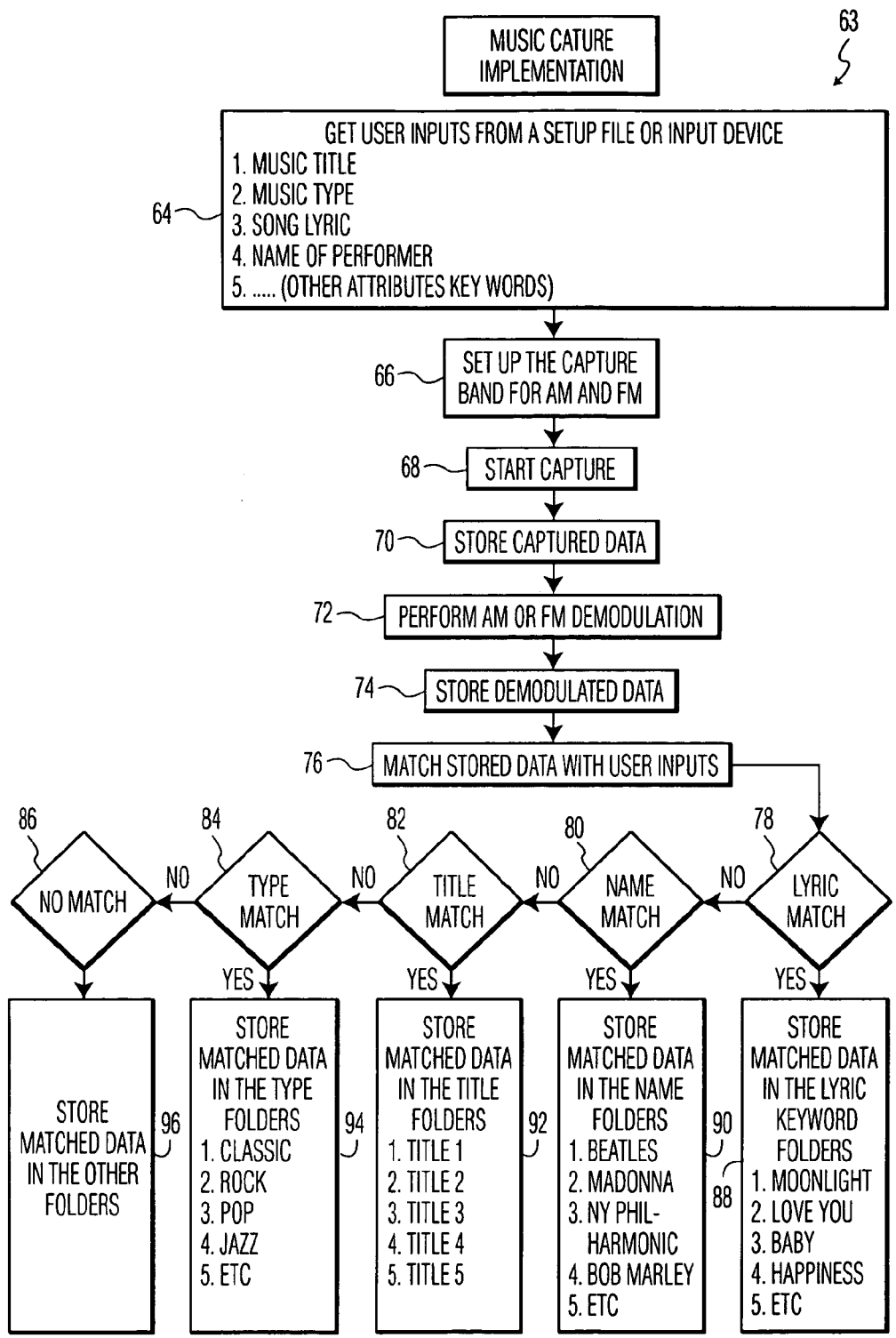
FIG. 4 depicts a music capture implementation of FIG. 3 showing a flowchart depicting an algorithm for processing user input to a processor.

FIG. 4 depicts a music capture implementation of FIG. 3 showing a flowchart depicting an algorithm 63 for processing user input to the processor in FIG. 2 and storing the data in specific folders, in accordance with embodiments of the present invention. The algorithm 63 may be implemented in software that is executed by a central processing unit (CPU) with the processor 7 of FIG. 1 or FIG. 2. Step 64 represents user inputs from a setup file or an input device. The user inputs may include music title, music type, song lyric, name of performer, etc. In step 66 a filter will be used to capture both amplitude modulation (AM) and frequency modulation (FM). The data is captured and stored in step 68 and step 70 consecutively. Step 72 performs AM or FM demodulation. The demodulated data is stored in step 74. Steps 76-96 in FIG. 4 represent a detailed description of steps 56 and 60 in FIG. 3. Step 76 matches stored data with user inputs. If a lyric match is found in step 78 then the matched data may be stored in a specific folder as shown in step 88. If a lyric match is not found in step 78 then the data is checked for a name match in step 80. If a name match is found in step 80 then the matched data may be stored in a specific folder as shown in step 90. If a name match is not found in step 80 then the data is checked for a title match in step 82. If a title match is found in step 82 then the matched data may be stored in a specific folder as shown in step 92. If a title match is not found in step 82 then the data is checked for a music type match in step 84. If a music type match is found in step 84 then the matched data may be stored in a specific folder as shown in step 94. If a music type match is not found in step 84 then the algorithm 63 categorizes the data as no match in step 86 and stores the data in an alternative folder.

Figure 5:
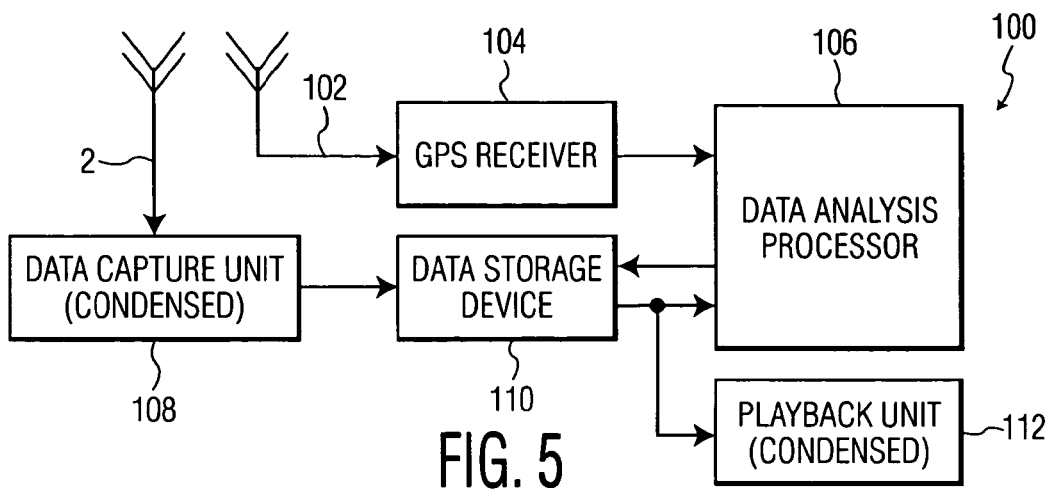
FIG. 5 is an alternative to FIG. 2 illustrating a block diagram view of a system to capture data from two different sources in order to provide a traffic report, in accordance with embodiments of the present invention.

FIG. 5 is an alternative to FIG. 2 illustrating a block diagram view of a system 100 to capture data from two different sources in order to provide a custom traffic report (e.g., accident reports, road closures, weather related traffic conditions, etc), with embodiments of the present invention. The data capture unit 108 comprises the filter 12, the analog to digital converter 4, and a data storage device 110 that is analogous to the storage device 5, of FIG. 2. In addition to simulating the system of FIG. 2, an antenna 102 may be coupled to a global positioning satellite (GPS) receiver 104. The GPS receiver 104 may capture data to provide position information. The data is sent to a processor 106. The processor 106 analyzes the data and compares the data to data captured from a data capture unit 108. After the two sets of data have been compared an appropriate custom traffic report (user specific) is found and stored in a data storage device 110 for retrieval by a playback unit 112.

Figure 6:
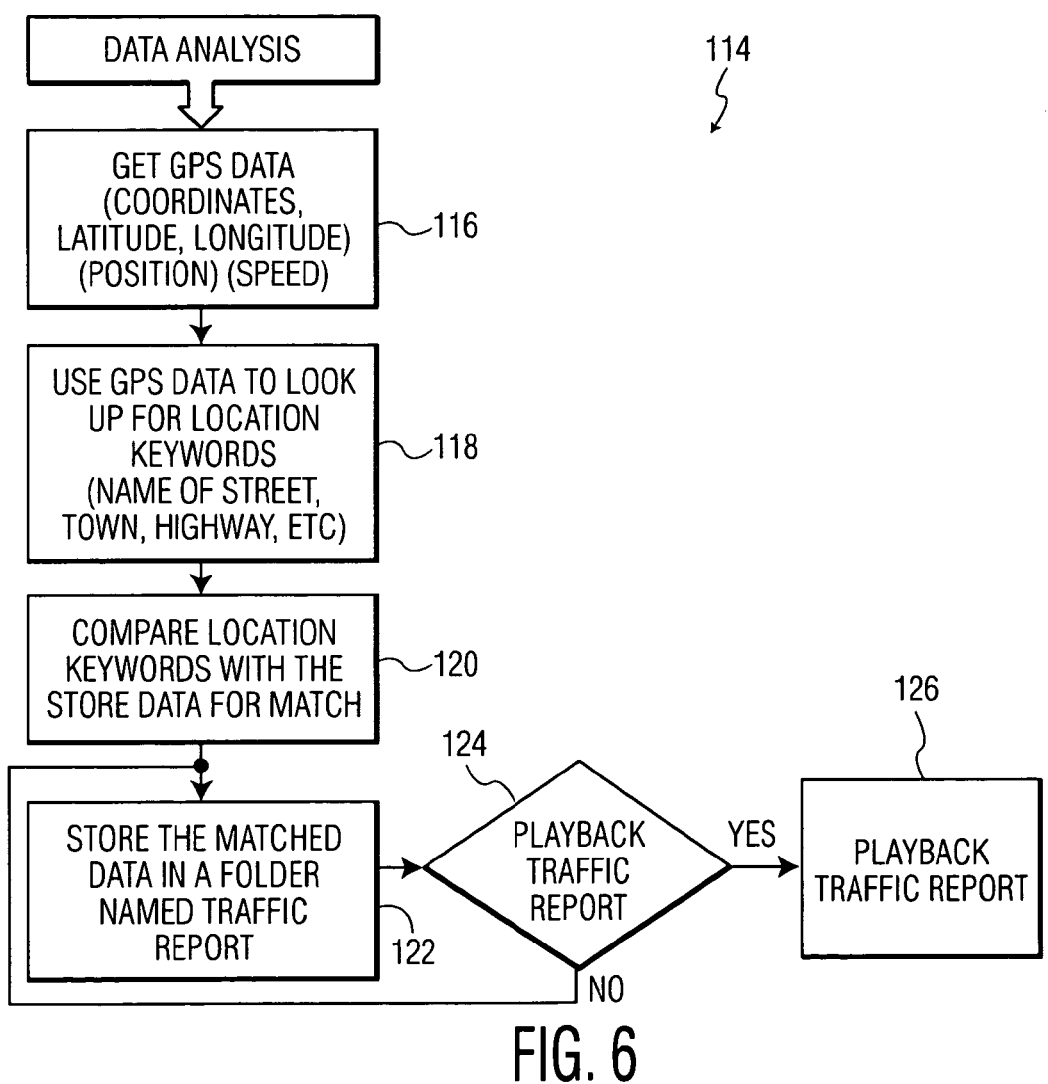
FIG. 6 is a flowchart depicting an algorithm for data analysis in FIG. 5, in accordance with embodiments of the present invention.

FIG. 6 is a flowchart depicting an algorithm 114 for data analysis in FIG. 5, in accordance with embodiments of the present invention. The algorithm 114 may be implemented in software that is executed by a central processing unit (CPU) within the processor 106 of FIG. 5. In step 116 positioning data (i.e., coordinates, latitude, longitude, position, speed, etc) is received from a global positioning satellite (GPS). In step 118 the data received from the GPS is analyzed for user specified keywords (e.g., name of street, town, highway number, etc). In step 120 captured data from a spectrum of radio frequency (RF) signals that comprise a plurality of different modulation techniques (i.e., as described in FIG. 1 description) is compared to the keywords until a match is found. When a match is found in step 120 the data is stored in step 122. Step 124 makes a decision to either play back the custom traffic report in step 126 or to go back to step 116. Alternatively, in step 122 the data may be stored in a specified location for playback at a later time.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A system to process a spectrum of radio frequency (RF) signals including audio or video content for playback by a user, comprising:

an analog to digital (A/D) converter configured to sample and digitize RF signals encompassing a fixed RF spectrum such that digitized data is generated, and to sample the spectrum of RF signals at a rate that is at least twice the frequency of the highest frequency signal contained within the spectrum;

at least one memory device adapted to store the digitized data; and a processor circuit, responsive to user selection data, configured to select a modulation technique of the RF signals by searching the digitized RF signals for at least two different modulation techniques, and process the digitized data according to the selected modulation technique and for playback to the user.

2. The system of claim 1, wherein the spectrum of RF signals are captured without having to tune to a channel or frequency band, and wherein the A/D convertor is a wide band A/D converter.

3. The system of claim 1, further comprising an input device adapted to receive the user selection data to select a portion of the digitized data stored in the memory device, and an output device adapted to output the selected portion of the digitized data for playback to the user, wherein the A/D convertor is a high speed A/D convertor.

4. The system of claim 3, wherein the system is configured and arranged to match the processed digitized data with a set of user inputs and to store the processed digitized data in a memory location as a function of the matched processed digitized data and user inputs.

5. The system of claim 1, further comprising a filter for filtering incoming RF signals to selectively transmit some frequencies of the incoming RF signals and selectively blocking other frequencies of the incoming RF signals, wherein the spectrum of RF signals sampled by the A/D converter includes the selectively transmitted signals.

6. The system of claim 5, wherein the filter is a wide bandpass filter and wherein the frequencies transmitted by the filter are selected responsive to a user input.

7. The system of claim 1, further comprising a digital to analog converter for converting the digitized data into analog data.

8. The system of claim 1, wherein a memory device of the at least one memory device is selected from the group consisting of a hard drive and an optical disc.

9. The system of claim 1, wherein the spectrum of RF signals includes audio content, video content, and data content.

10. A method to process a spectrum of radio frequency (RF) signals including audio or video content for playback by a user, comprising:

sampling and digitizing, by an analog to digital (A/D) converter and at a rate that is at least twice the highest frequency of the highest frequency signal contained within the spectrum, RF signals encompassing a fixed RF spectrum such that digitized data is generated;

storing the digitized data on a memory device;

selecting a modulation technique of the RF signals by searching the digitized RF signals for at least two different modulation techniques; and responsive to user selection data and the selected modulation technique, processing the digitized data using a processor for playback to the user.

11. The method of claim 10, further comprising filtering incoming RF signals to selectively transmit some frequencies of the incoming RF signals and to selectively block other frequencies of the incoming RF signals, wherein the spectrum of RF signals sampled by the A/D converter includes the selectively transmitted signals.

12. The method of claim 11, further comprising selecting the frequencies transmitted by the filter responsive to a user input, and wherein the filter is a wide bandpass filter.

13. The method of claim 10, further comprising selecting a portion of the digitized data stored on the memory device responsive to the user selection data and playing the selected portion of the digitized data for the user, and wherein the plurality of modulation techniques include amplitude modulation and frequency modulation.

14. The method of claim 13, further comprising identifying songs to be played for the user as a function of the user selection data and providing the identified songs from the digitized data, and wherein the plurality of modulation techniques further include phase modulation.

15. The method of claim 10, wherein the spectrum of RF signals are captured without having to tune to a channel or frequency band, and wherein the plurality of modulation techniques include frequency modulation and phase modulation.

16. The method of claim 10, further comprising determining a modulation method that is associated with each modulation technique.

17. The method of claim 16, further comprising demodulating the digitized data.

18. The method of claim 17, further comprising processing a user input request to select at least one portion of the demodulated data.

19. The method of claim 10, wherein said processing is performed prior to said storing.

20. The method of claim 10, wherein the spectrum of RF signals includes audio content, video content, and data content.

21. The method of claim 10, further comprising converting the digitized data into analog data.

* * * * *